(12) United States Patent
Koshimizu

(10) Patent No.: US 11,034,116 B2
(45) Date of Patent: Jun. 15, 2021

(54) SERVO PRESS MACHINE

(71) Applicant: AIDA ENGINEERING, LTD., Kanagawa (JP)

(72) Inventor: Takashi Koshimizu, Zama (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 243 days.

(21) Appl. No.: 16/053,449

(22) Filed: Aug. 2, 2018

(65) Prior Publication Data
US 2019/0039343 A1 Feb. 7, 2019

(30) Foreign Application Priority Data

Aug. 4, 2017 (JP) .............................. JP2017-151629

(51) Int. Cl.
*B30B 15/00* (2006.01)
*B30B 1/26* (2006.01)
(Continued)

(52) U.S. Cl.
CPC ............ *B30B 15/0088* (2013.01); *B30B 1/26* (2013.01); *B30B 1/266* (2013.01); *F16C 7/02* (2013.01);
(Continued)

(58) Field of Classification Search
CPC ... B30B 15/0088; B30B 15/0011; B30B 1/26; B30B 1/266; F16C 33/1045;
(Continued)

(56) References Cited

U.S. PATENT DOCUMENTS 6,186,061 B1 2/2001 Burns et al.
2008/0178652 A1 7/2008 Baba et al.
(Continued)

FOREIGN PATENT DOCUMENTS

CN 203651040 U 6/2014
JP 2006-105371 A 4/2006
(Continued)

OTHER PUBLICATIONS

Notice of Reasons for Refusal issued in Japanese Patent Application No. 2017-151629, dated Sep. 3, 2019, with English translation.
(Continued)

*Primary Examiner* — Teresa M Ekiert
*Assistant Examiner* — Sarkis A Aktavoukian
(74) *Attorney, Agent, or Firm* — McDermott Will & Emery LLP

(57) ABSTRACT

A servo press machine includes an eccentric shaft, a connecting rod, a slide, an eccentric shaft-side sliding surface, a connecting rod-side sliding surface, an oil supply port, and a supply mechanism. The oil supply port opens on the eccentric shaft-side sliding surface or the connecting rod-side sliding surface, and supplies a lubricant between the eccentric shaft-side sliding surface and the connecting rod-side sliding surface. The supply mechanism supplies the lubricant to the oil supply port. The eccentric shaft-side sliding surface is formed on the eccentric shaft that is rotationally driven by a servomotor. The oil supply port is formed on the connecting rod-side sliding surface of the connecting rod that moves upward and downward due to the rotational driving of the eccentric shaft.

9 Claims, 8 Drawing Sheets

(51) Int. Cl.
*F16N 7/22* (2006.01)
*F16N 3/08* (2006.01)
*F16C 33/10* (2006.01)
*F16C 7/02* (2006.01)

(52) U.S. Cl.
CPC ...... *F16C 33/1025* (2013.01); *F16C 33/1045* (2013.01); *F16C 33/1065* (2013.01); *F16N 3/08* (2013.01); *F16N 7/22* (2013.01)

(58) Field of Classification Search
CPC ...... F16C 33/1055; F16C 33/106; F16C 3/14; F16C 3/18; F16C 7/02; F16C 33/1065; F16C 33/1025; F16C 9/02; F16C 9/04; F16C 17/02; F16C 17/022; F16C 17/026; F16C 33/1085; F16N 7/18; F16N 7/20; F16N 7/385; F16N 25/02; B21D 22/286; B21D 37/18
See application file for complete search history.

(56) References Cited

U.S. PATENT DOCUMENTS

| | | |
|---|---|---|
| 2009/0248188 A1 | 10/2009 | Haas et al. |
| 2012/0192615 A1* | 8/2012 | Martinez Ortiz del Rio ............... B30B 15/0088 72/446 |
| 2013/0025475 A1 | 1/2013 | Fahrenbach |
| 2016/0131185 A1* | 5/2016 | Tanaka .................... F16C 33/14 384/120 |
| 2016/0356313 A1* | 12/2016 | Grillo ................. F16C 33/6681 |
| 2017/0276168 A1 | 9/2017 | Seki |

FOREIGN PATENT DOCUMENTS

| | | | |
|---|---|---|---|
| JP | 2006105371 A | * 4/2006 | |
| JP | 2016130534 A | * 7/2016 | |
| JP | 2017-096396 A | 6/2017 | |
| WO | 2006/098253 A1 | 9/2006 | |
| WO | WO-2016157575 A1 | * 10/2016 | ................ F16C 7/02 |

OTHER PUBLICATIONS

Extended European Search Report issued in corresponding European Patent Application No. 18187099.9-1019, dated Jan. 21, 2019.
Chinese Office Action issued in corresponding Chinese Patent Application 201810879409.3, dated Mar. 2, 2021, with English translation.

* cited by examiner

SERVO PRESS MACHINE

Japanese Patent Application No. 2017-151629, filed on Aug. 4, 2017, is hereby incorporated by reference in its entirety.

BACKGROUND OF THE INVENTION

The present invention relates to a servo press machine and particularly to a servo press machine and a lubricant supply method that reliably supply a lubricant between two sliding surfaces.

Conventionally, a sliding bearing structure is adopted between a connecting rod and a crankshaft of a press machine (for example, JP-A-2006-105371). Typically, a groove for supplying oil is provided on a bush of a sliding bearing structure provided on a connecting rod, and a lubricant is supplied to the groove in order to prevent lubrication failure of sliding portions and avoid prevent seizure in the sliding bearing structure.

The groove for supplying oil provided on the bush is basically exposed to air, and the lubricant filled in the groove flows into a gap between a crankshaft and the bush and lubricates the crankshaft and the bush while the crankshaft rotates.

In recent years, as servo press machines that rotate a crankshaft (an eccentric shaft) with a servomotor have become mainstream among press machines, press working methods unique to servo press machines are being adopted. For example, in a servo press machine, there is a working method that causes a connecting rod to ascend and descend by having a crankshaft perform reciprocal rotation (pendular operation) instead of simply rotating in one direction. In this case, by setting most of a slide motion of one cycle in a press load period in which a press load is generated, a cycle time of press working can be reduced. With such a working method, a gap is hardly created between the crankshaft and a press load-side surface of the connecting rod and a lubricant is no longer sufficiently supplied from the groove to the sliding surfaces.

SUMMARY

The invention can provide a servo press machine and a lubricant supply method that are capable of reliably supplying a lubricant between an eccentric shaft-side sliding surface and a connecting rod-side sliding surface. In addition, the invention can provide a servo press machine and a lubricant supply method that are capable of reliably supplying a lubricant between a connecting rod tip section-side sliding surface and a connecting section-side sliding surface.

According to a first aspect of the invention, there is provided a servo press machine including an eccentric shaft which is rotationally driven by a servomotor, a connecting rod which moves upward and downward due to the rotational driving of the eccentric shaft, and a slide which moves upward and downward as the connecting rod moves upward and downward, the servo press machine comprising:

an eccentric shaft-side sliding surface on which a press load during press working acts;

a connecting rod-side sliding surface on which the press load acts and which slides with the eccentric shaft-side sliding surface;

an oil supply port which opens on the eccentric shaft-side sliding surface or the connecting rod-side sliding surface and which supplies a lubricant between the eccentric shaft-side sliding surface and the connecting rod-side sliding surface; and a supply mechanism which supplies the lubricant to the oil supply port, the supply mechanism delivering the lubricant to the oil supply port and pressurizing the lubricant during a press load period in which the oil supply port is closed by the connecting rod-side sliding surface or the eccentric shaft-side sliding surface on which the press load is acting, and the supply mechanism supplying the pressurized lubricant between the eccentric shaft-side sliding surface and the connecting rod-side sliding surface from the oil supply port during a non-press load period in which the press load is not acting on the eccentric shaft-side sliding surface and the connecting rod-side sliding surface.

According to a second aspect of the invention, there is provided a servo press machine including an eccentric shaft which is rotationally driven by a servomotor, a connecting rod which moves upward and downward due to the rotational driving of the eccentric shaft, a slide which moves upward and downward as the connecting rod moves upward and downward, and a connecting section which connects a tip section of the connecting rod and the slide with each other, the servo press machine comprising: a connecting rod tip section-side sliding surface on which a press load during press working acts;

a connecting section-side sliding surface on which the press load acts and which slides with the connecting rod tip section-side sliding surface;

an oil supply port which opens on the connecting rod tip section-side sliding surface or the connecting section-side sliding surface and which supplies a lubricant between the connecting rod tip section-side sliding surface and the connecting section-side sliding surface; and a supply mechanism which supplies the lubricant to the oil supply port, the supply mechanism delivering the lubricant to the oil supply port and pressurizing the lubricant during a press load period in which the oil supply port is closed by the connecting section-side sliding surface or the connecting rod tip section-side sliding surface on which the press load is acting, and the supply mechanism supplying the pressurized lubricant between the connecting rod tip section-side sliding surface and the connecting section-side sliding surface from the oil supply port during a non-press load period in which the press load is not acting on the connecting rod tip section-side sliding surface and the connecting section-side sliding surface.

DETAILED DESCRIPTION OF THE EMBODIMENT

Figure 1:
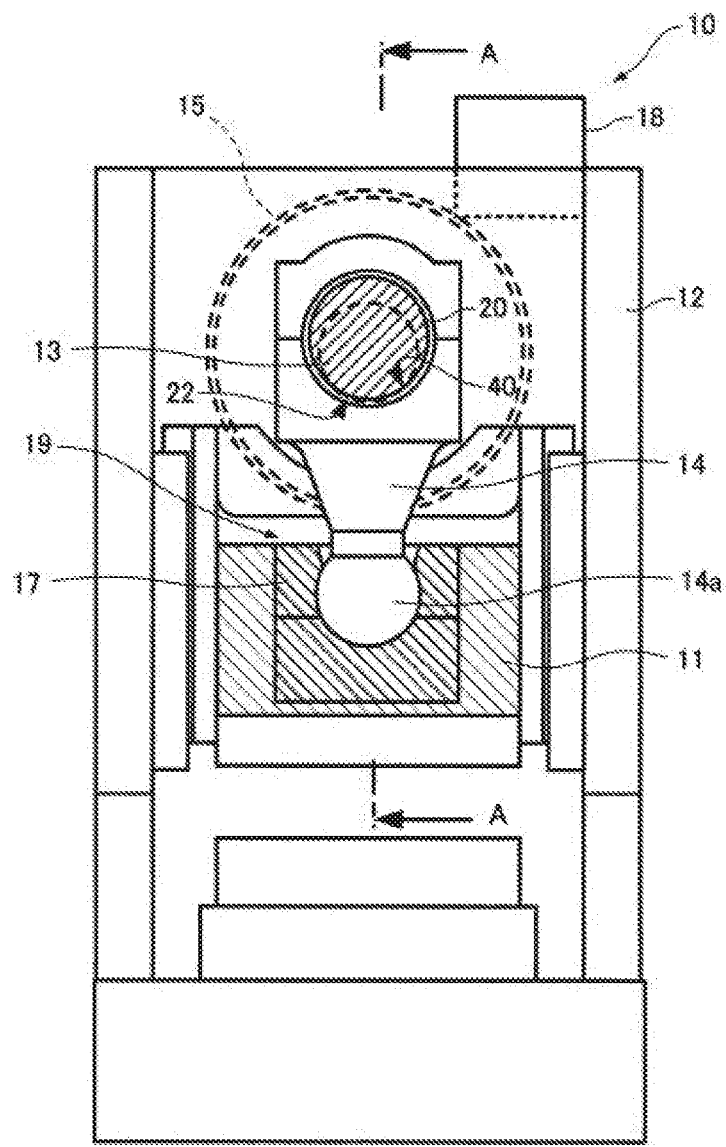
FIG. 1 is a front view of a servo press machine according to the first embodiment.

The invention has been made in order to solve at least a part of the problems described above and can be realized as the embodiments presented below.

According to one embodiment of the invention, there is provided a servo press machine including an eccentric shaft which is rotationally driven by a servomotor, a connecting rod which moves upward and downward due to the rotational driving of the eccentric shaft, and a slide which moves upward and downward as the connecting rod moves upward and downward, the servo press machine comprising:

an eccentric shaft-side sliding surface on which a press load during press working acts;

a connecting rod-side sliding surface on which the press load acts and which slides with the eccentric shaft-side sliding surface;

an oil supply port which opens on the eccentric shaft-side sliding surface or the connecting rod-side sliding surface and which supplies a lubricant between the eccentric shaft-side sliding surface and the connecting rod-side sliding surface; and a supply mechanism which supplies the lubricant to the oil supply port, the supply mechanism delivering the lubricant to the oil supply port and pressurizing the lubricant during a press load period in which the oil supply port is closed by the connecting rod-side sliding surface or the eccentric shaft-side sliding surface on which the press load is acting, and the supply mechanism supplying the pressurized lubricant between the eccentric shaft-side sliding surface and the connecting rod-side sliding surface from the oil supply port during a non-press load period in which the press load is not acting on the eccentric shaft-side sliding surface and the connecting rod-side sliding surface.

With the press machine according to the embodiment described above, using a pressurized lubricant enables the lubricant to be reliably supplied between the eccentric shaft-side sliding surface and the connecting rod-side sliding surface during a non-press load period.

According to one embodiment of the invention, there is provided a servo press machine including an eccentric shaft which is rotationally driven by a servomotor, a connecting rod which moves upward and downward due to the rotational driving of the eccentric shaft, a slide which moves upward and downward as the connecting rod moves upward and downward, and a connecting section which connects a tip section of the connecting rod and the slide with each other, the servo press machine comprising:

a connecting rod tip section-side sliding surface on which a press load during press working acts;

a connecting section-side sliding surface on which the press load acts and which slides with the connecting rod tip section-side sliding surface;

an oil supply port which opens on the connecting rod tip section-side sliding surface or the connecting section-side sliding surface and which supplies a lubricant between the connecting rod tip section-side sliding surface and the connecting section-side sliding surface; and a supply mechanism which supplies the lubricant to the oil supply port, the supply mechanism delivering the lubricant to the oil supply port and pressurizing the lubricant during a press load period in which the oil supply port is closed by the connecting section-side sliding surface or the connecting rod tip section-side sliding surface on which the press load is acting, and the supply mechanism supplying the pressurized lubricant between the connecting rod tip section-side sliding surface and the connecting section-side sliding surface from the oil supply port during a non-press load period in which the press load is not acting on the connecting rod tip section-side sliding surface and the connecting section-side sliding surface.

With the press machine according to the embodiment described above, a lubricant can be reliably supplied between a connecting rod tip section-side sliding surface and a connecting section-side sliding surface.

Embodiments of the invention are described in detail below with reference to the drawings. Note that the following embodiments do not unduly limit the scope of the invention as stated in the claims. In addition, all of the elements described in connection with the following embodiments should not necessarily be taken as essential requirements of the invention.

1. First Embodiment

An outline of a servo press machine 10 according to the first embodiment will be described with reference to FIGS. 1 and 2. FIG. 1 is a front view of a servo press machine according to the first embodiment, and FIG. 2 is a sectional view taken along A-A in FIG. 1.

As illustrated in FIG. 1, the servo press machine 10 is provided with a frame 12, an eccentric shaft 13 rotatably supported by the frame 12, a connecting rod 14 of which a large end section is connected to the eccentric shaft 13, and a slide 11 connected to a tip section 14a of the connecting rod 14.

The servo press machine 10 is further provided with a servomotor 18 fixed to the frame 12 and a main gear 15 fixed to one end of the eccentric shaft 13. Rotational driving of the servomotor 18 can cause the main gear 15 to rotate and can rotationally drive the eccentric shaft 13. The connecting rod 14 moves upward and downward due to the rotational driving of the eccentric shaft 13, and the slide 11 moves upward and downward as the connecting rod 14 moves upward and downward.

Figure 2:
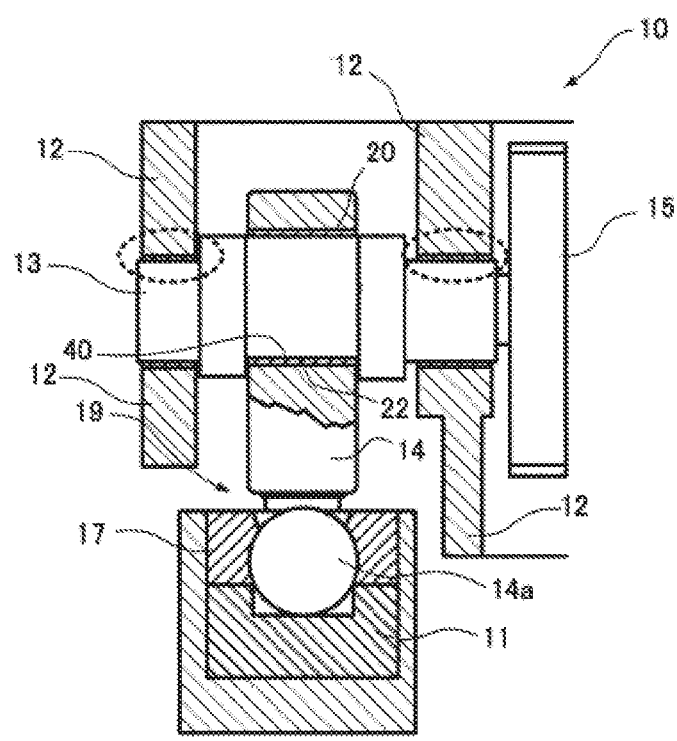
FIG. 2 is a sectional view taken along A-A in FIG. 1.

As illustrated in FIG. 2, the eccentric shaft 13 is a crankshaft. An eccentric boss may be employed as the eccentric shaft 13. The eccentric shaft 13 and the connecting rod 14 form an eccentric mechanism. The eccentric mechanism is a mechanism that converts a rotational motion into a reciprocating rectilinear motion and, due to the eccentric mechanism, the slide 11 connected to the connecting rod 14 is capable of ascending and descending with respect to a stationary-side bolster. An upper die is mounted to the slide 11 and a lower die is mounted to the bolster. When the eccentric shaft 13 is rotated by the servomotor 18, the tip section 14a of the connecting rod 14 moves upward and downward on the slide 11.

The connecting rod 14 has a sliding bearing 20 on a large end section on an opposite side to the tip section 14a. An inner circumferential surface of the sliding bearing 20 comes into contact with an outer circumferential surface of the eccentric shaft 13.

The slide 11 is guided by the frame 12 and moves upward and downward due to driving of the servomotor 18. A die is fixed to a lower surface of the slide 11.

The servomotor 18 is, for example, an electric motor, and an AC servomotor, an induction motor, a reluctance motor, a DC servomotor, or the like can be adopted as the servomotor 18. Driving of the servomotor 18 by a command of a control unit (not shown) causes the die fixed to the slide 11 to ascend and descend with respect to a workpiece in a slide motion programmed in advance. In FIGS. 1 and 2, the slide 11 is at top dead center.

Although press working is generally performed near bottom dead center of the slide 11 since the servo press machine 10 produces a maximum pressurizing force at bottom dead center of the slide 11, in recent years, the use of the servomotor 18 has increased a period in which a press load is generated. In addition, since press working that minimizes a length of a non-working stroke relative to a length of a working stroke is performed in order to increase yield in a pendular operation unique to the servo press machine 10, a period in which press working is not performed in a slide motion is becoming shorter.

1-1. Oil Supply Port and Supply Mechanism

Figure 3:
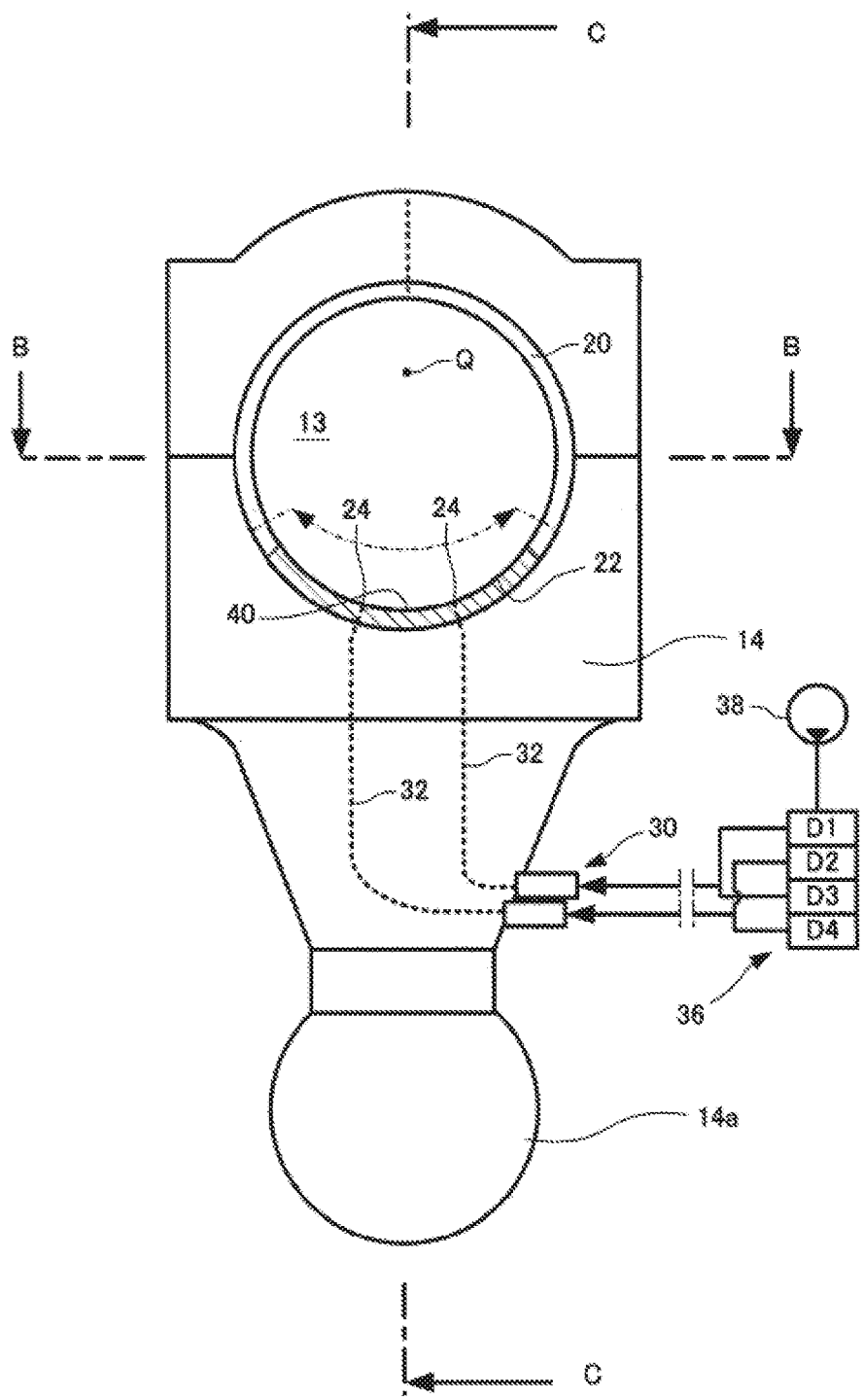
FIG. 3 is a front view of a connecting rod.
Figure 4:
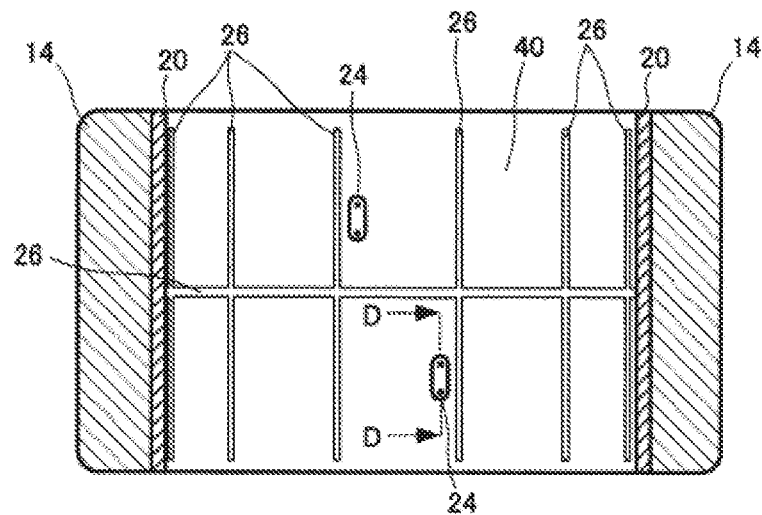
FIG. 4 is a sectional view taken along B-B in FIG. 3.
Figure 5:
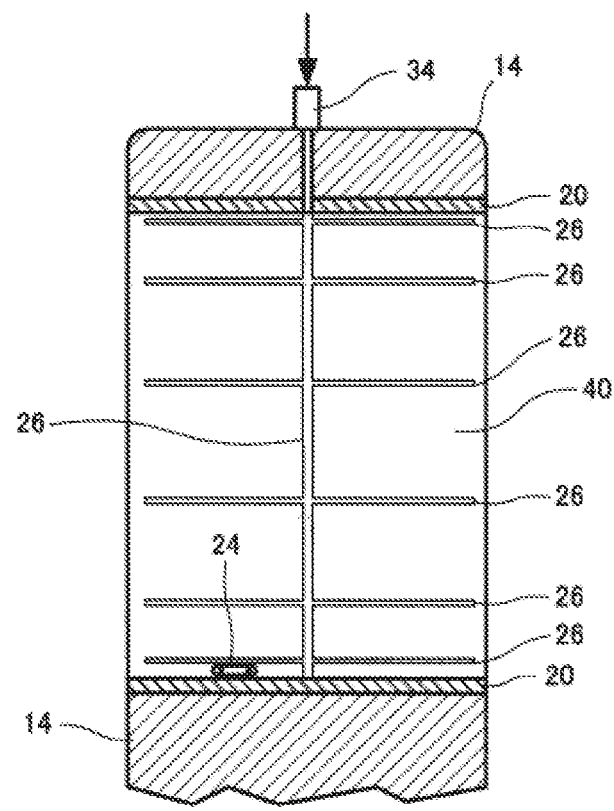
FIG. 5 is a sectional view taken along C-C in FIG. 3.
Figure 6:
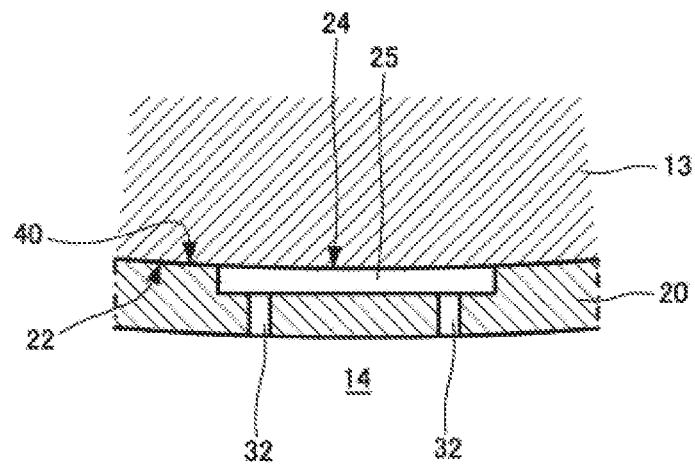
FIG. 6 is a sectional view taken along D-D in FIG. 4.

An oil supply port and a supply mechanism of a lubricant will be described with reference to FIGS. 3 to 6. FIG. 3 is a front view of a connecting rod, FIG. 4 is a sectional view taken along B-B in FIG. 3, FIG. 5 is a sectional view taken along C-C in FIG. 3, and FIG. 6 is a sectional view taken along D-D in FIG. 4.

As illustrated in FIG. 3, the servo press machine 10 includes: a sliding surface 22 (hereinafter, referred to as an eccentric shaft-side sliding surface 22) that is a part of the outer circumferential surface of the eccentric shaft 13 on which a press load acts during press working; a sliding surface 40 (hereinafter, referred to as a connecting rod-side sliding surface 40) that is the inner circumferential surface of the sliding bearing 20 on which a press load acts and which slides with the eccentric shaft-side sliding surface 22; an oil supply port 24 which opens on the eccentric shaft-side sliding surface 22 or the connecting rod-side sliding surface 40 and which supplies a lubricant between the eccentric shaft-side sliding surface 22 and the connecting rod-side sliding surface 40; and a supply mechanism 30 which supplies the lubricant to the oil supply port 24.

In this manner, the connecting rod 14 has the sliding bearing 20, the connecting rod-side sliding surface 40 is the inner circumferential surface of the sliding bearing 20 which is interposed between the eccentric shaft 13 and the connecting rod 14, and the oil supply port 24 is formed on the sliding bearing 20. Forming the oil supply port 24 on the sliding bearing 20 enables the oil supply port 24 to be relatively readily machined as compared to a case in which the oil supply port 24 is formed on the connecting rod 14 itself.

The supply mechanism 30 includes: an oil supply path 32 extending into the connecting rod 14; a distributor 36 which distributes the lubricant to the oil supply path 32; and a pump 38 which delivers the lubricant to the distributor 36. One end section of the oil supply path 32 constitutes the oil supply port 24, and another end section of the oil supply path 32 is connected to the distributor 36. The oil supply path 32 may be provided so as to extend on an outer circumferential surface of the connecting rod 14 until reaching a vicinity of the oil supply port 24. The distributor 36 can distribute and deliver the lubricant delivered from the pump 38 to a plurality of oil supply ports 24. The distributor 36 can be internally provided with a check valve and a relief valve. Even if providing the distributor 36 prevents the lubricant from being discharged from one oil supply port 24, a decline in performance of delivering the lubricant to another oil supply port 24 can be avoided by the relief valve.

The distributor 36 is formed of a plurality of lubricant discharge blocks D1 to D4 (hereinafter, referred to as blocks D1 to D4). The plurality of blocks D1 to D4 are all connected to the oil supply port 24. When the oil supply port 24 is closed during press working, the lubricant is pressurized by being discharged from the blocks D1 to D4.

In addition, a lubricant delivering function may be provided inside the distributor 36. A progressive quantitative distribution valve can be adopted as the distributor 36. The progressive quantitative distribution valve has a piston for discharging the lubricant inside each port of the blocks D1 to D4 and is capable of intermittently discharging the lubricant from the oil supply port 24 at, for example, several ten cycles per minute. In order to reliably feed the lubricant to the oil supply port 24, a plurality of ports of the distributor 36 can be connected to one oil supply port 24 in accordance with a forming cycle of press working. As illustrated in FIG. 3, for example, by feeding the lubricant from ports of the blocks D1 and D3 to one oil supply port 24, a delivery cycle of the port of the block D1 can be complemented by the port of the block D3.

The pump 38 can deliver the lubricant to the oil supply path 32 from a lubricant tank (not shown). The lubricant delivered by the pump 38 is delivered by the distributor 36 to two oil supply paths 32 from the four ports of the blocks D1 to D4, and the lubricant delivered by the pump 38 is pressurized while the oil supply port 24 is closed by the eccentric shaft-side sliding surface 22 and the connecting rod-side sliding surface 40. Other known means may be adopted as long as the lubricant can be delivered to the oil supply path 32 and be pressurized.

The supply mechanism 30 delivers the lubricant to the oil supply port 24 and pressurizes the lubricant during a press load period in which the oil supply port 24 is closed by the eccentric shaft-side sliding surface 22 or the connecting rod-side sliding surface 40 on which the press load is acting, and supplies the pressurized lubricant between the eccentric shaft-side sliding surface 22 and the connecting rod-side sliding surface 40 from the oil supply port 24 during a non-press load period in which a press load is not acting on the eccentric shaft-side sliding surface 22 and the connecting rod-side sliding surface 40. Using the lubricant pressurized by the supply mechanism 30 enables the lubricant to be reliably supplied between the eccentric shaft-side sliding surface 22 and the connecting rod-side sliding surface 40 during the non-press load period.

The press load period is a period in which press working is performed in one forming cycle from the moment the slide 11 descends and the die mounted to the slide 11 comes into contact with a workpiece to start working to the moment working ends (the slide 11 reaches bottom dead center). The non-press load period is a period other than the press load period in a slide motion in which the die mounted to the slide 11 is not in contact with the workpiece.

In FIG. 3, for example, a range indicated by hatchings in the sliding bearing 20 is a region on which a press load acts during the press load period. When the eccentric shaft 13 reciprocates in a range indicated by a dot-dashed arrow, narrow ranges that remain on both sides of the hatched region indicate regions in which the press load is not acting on the eccentric shaft-side sliding surface 22 and the connecting rod-side sliding surface 40 during the non-press load period. With conventional press machines, a gap that enables a sufficient amount of the lubricant to be supplied cannot be obtained with such short regions. However, even with such short regions, the lubricant can be reliably supplied due to the lubricant pressurized during the press load period quickly spreading between the eccentric shaft-side sliding surface 22 and the connecting rod-side sliding surface 40 during the non-press load period.

As illustrated in FIGS. 4 and 5, an oil supply groove 26 for supplying the lubricant is formed on the connecting rod-side sliding surface 40 so as to extend over the entire connecting rod-side sliding surface 40. The oil supply groove 26 may be formed on the eccentric shaft-side sliding surface 22. The lubricant is injected from an oil supply nipple 34 provided at an upper end of the connecting rod 14 and flows along the oil supply groove 26. Since the oil supply groove 26 has a gap created by a difference between an outer diameter of the eccentric shaft 13 and an inner diameter of the connecting rod 14 and is exposed to air, the oil supply groove 26 is never completely closed by the eccentric shaft-side sliding surface 22 even during press working. Since the lubricant injected from the oil supply nipple 34 need only flow along the oil supply groove 26, the lubricant is constantly fed at low pressure.

The oil supply groove 26 is a groove which continues from the oil supply nipple 34 and which extends over the entire connecting rod-side sliding surface 40. When a press load acts on a predetermined range of the eccentric shaft-side sliding surface 22 and the connecting rod-side sliding surface 40 during press working, the lubricant is not sufficiently supplied between the eccentric shaft-side sliding surface 22 and the connecting rod-side sliding surface 40 from the oil supply groove 26 within the range. This is because the eccentric shaft-side sliding surface 22 and the connecting rod-side sliding surface 40 come into close contact with each other without any gap therebetween and the oil supply groove 26 is closed.

The oil supply port 24 opens in a region where the oil supply groove 26 is not formed. Due to the oil supply port 24 opening in a region where the oil supply groove 26 exposed to air is not provided, pressure of the lubricant can be increased to predetermined pressure during the press load period. The oil supply port 24 is formed in a region of the connecting rod-side sliding surface 40 which is closed by the eccentric shaft-side sliding surface 22 and metal-sealed during the press load period. This enables the pressure of the lubricant inside the oil supply port 24 to rise during the press load period. This also enables the lubricant to be reliably injected to a region where the lubricant becomes depleted during press working.

The oil supply port 24 is formed in a region other than a portion of the connecting rod-side sliding surface 40 which mostly receives a press load when the slide 11 is at bottom dead center. When the oil supply port 24 is similarly formed on the eccentric shaft-side sliding surface 22, the oil supply port 24 is formed in a region other than a portion which mostly receives a press load. Forming the oil supply port 24 in a region other than a portion which mostly receives a press load enables the oil supply port 24 to be provided on the eccentric shaft-side sliding surface 22 or the connecting rod-side sliding surface 40 without reducing mechanical strength of the portion which mostly receives the press load. Typically, the portion which mostly receives a press load when the slide 11 is at bottom dead center is below a center of rotation Q of the eccentric shaft 13 in a vertical direction. As illustrated in FIG. 3, while the oil supply port 24 is provided at positions separated to the left and right from a portion vertically below the center of rotation Q of the eccentric shaft 13 when the slide 11 is at bottom dead center, the oil supply port 24 may be provided in the portion vertically below the center of rotation Q if the eccentric shaft 13 and the connecting rod 14 have sufficient mechanical strength.

As illustrated in FIG. 6, the oil supply port 24 includes an oil reservoir 25 which has an opening area greater than an area of a cross section of the oil supply path 32 extending toward the oil supply port 24. Providing the oil reservoir 25 in the sliding bearing 20 enables the lubricant to be supplied to the eccentric shaft-side sliding surface 22 in an efficient manner. While the oil supply port 24 has a flat shape in a plan view as illustrated in FIG. 4, the shape of the oil supply port 24 is not limited thereto.

Maximum pressure of the lubricant supplied to the oil supply port 24 during the press load period is set so as to correspond to a force exceeding a load or a force causing the eccentric shaft-side sliding surface 22 and the connecting rod-side sliding surface 40 to come into close contact with each other during the non-press load period. Setting such maximum pressure enables the lubricant to be supplied between the eccentric shaft-side sliding surface 22 and the connecting rod-side sliding surface 40 from the oil supply port 24 against a load or a force that causes the eccentric shaft-side sliding surface 22 and the connecting rod-side sliding surface 40 to come into close contact with each other during the non-press load period. The maximum pressure of the lubricant in the oil supply port 24 is capable of canceling the close contact between the eccentric shaft-side sliding surface 22 and the connecting rod-side sliding surface 40 and spreading the lubricant between the eccentric shaft-side sliding surface 22 and the connecting rod-side sliding surface 40.

The servo press machine 10 may adopt a slide motion with an extremely short non-press load period. For example, in the case of a so-called pendular operation (the dot-dashed arrow in FIG. 3), the region indicated by hatchings in FIG. 3 maintains a state where the eccentric shaft-side sliding surface 22 and the connecting rod-side sliding surface 40 are in close contact with each other even during the non-press load period. In this case, the lubricant is not sufficiently supplied from the oil supply groove 26 to a region in which the oil supply groove 26 is not formed in the eccentric shaft-side sliding surface 22. This is because a gap wide enough to allow the lubricant to flow from the oil supply groove 26 is not created between the eccentric shaft-side sliding surface 22 and the connecting rod-side sliding surface 40. However, the lubricant of which pressure is increased in the oil supply port 24 during the press load period overcomes the force causing the eccentric shaft-side sliding surface 22 and the connecting rod-side sliding surface 40 to come into close contact with each other and spreads between the eccentric shaft-side sliding surface 22 and the connecting rod-side sliding surface 40 in a short period of time during the non-press load period.

As described above, even if the non-press load period is short, the lubricant can be reliably supplied between the eccentric shaft 13 and the connecting rod 14 on which a press working load acts and, as a result, lubrication failure of sliding portions can be prevented and a seizure in a sliding bearing structure can be avoided.

2. Lubricant Supply Method

Figure 7:
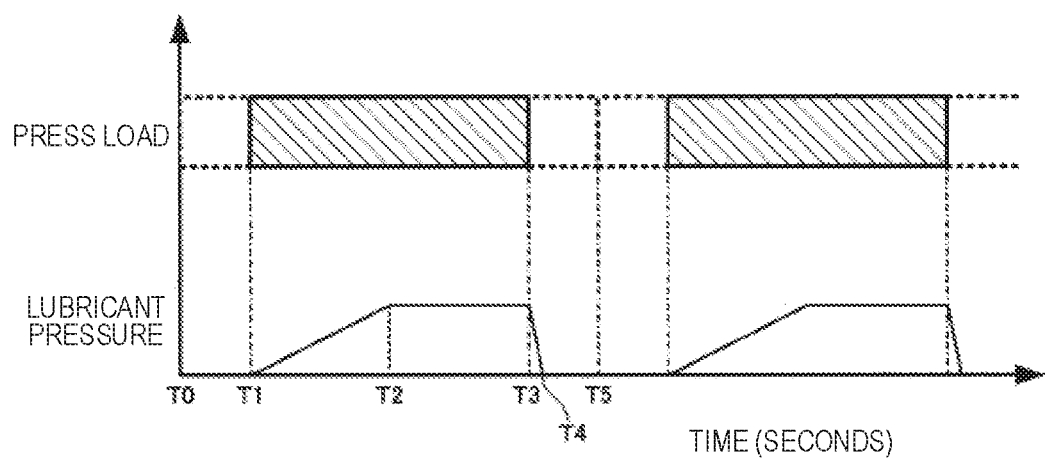
FIG. 7 is a timing chart illustrating a lubricant supply method according to the first embodiment.

Next, a lubricant supply method using the servo press machine 10 according to the first embodiment will be described with reference to FIGS. 1 to 7. FIG. 7 is a timing chart illustrating the lubricant supply method.

The lubricant supply method is a method of supplying the lubricant between the eccentric shaft-side sliding surface 22 and the connecting rod-side sliding surface 40 on which a press load acts during press working by the servo press machine 10.

As illustrated in FIG. 7, a period from a time point T1 to a time point T5 represents one forming cycle, in which a period from the time point T1 to the time point T3 corresponds to a press load period and a period from a time point T0 to the time point T1 and a period from the time point T3 to the time point T5 correspond to a non-press load period. In the press load period (the period from the time point T1 to the time point T3) in which the oil supply port 24 that opens on the eccentric shaft-side sliding surface 22 or the connecting rod-side sliding surface 40 is closed by the connecting rod-side sliding surface 40 or the eccentric shaft-side sliding surface 22 on which a press load acts, the lubricant is delivered to the oil supply port 24 and pressurized. Pressure of the lubricant rises during a period from the time point T1 to the time point T2 as the lubricant is delivered by the supply mechanism 30 and the oil supply port 24 is closed by the connecting rod-side sliding surface 40, and reaches set pressure. Alternatively, the pressure of the lubricant may reach the set pressure by being continuously increased during the period from the time point T1 to the time point T3. When the set pressure is already reached at the time point T2, using the distributor 36 shown in FIG. 3, the set pressure is maintained with a relief valve provided in the oil supply path 32 during a period from the time point T2 to the time point T3.

The pressurized lubricant is supplied between the eccentric shaft-side sliding surface 22 and the connecting rod-side sliding surface 40 from the oil supply port 24 during the non-press load period (the period from the time point T3 to the time point T5) in which a press load is not acting on the eccentric shaft-side sliding surface 22 and the connecting rod-side sliding surface 40. The pressurized lubricant spreads along the eccentric shaft-side sliding surface 22 in an instant (during a period from the time point T3 to the time point T4) so as to push open the eccentric shaft-side sliding surface 22 and the connecting rod-side sliding surface 40. Using the pressurized lubricant enables the lubricant to be reliably supplied between the eccentric shaft-side sliding surface 22 and the connecting rod-side sliding surface 40 even during a short non-press load period.

3. Second Embodiment

Figure 8:
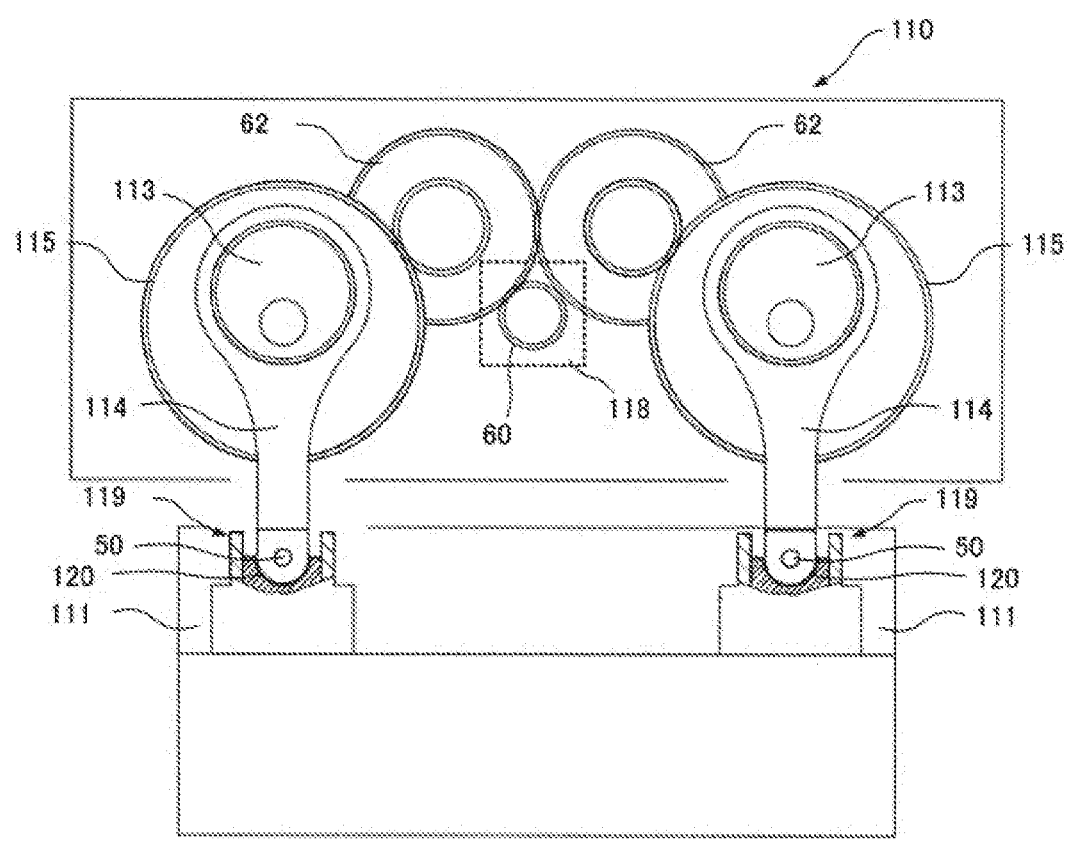
FIG. 8 is a front view of a servo press machine according to the second embodiment.
Figure 9:
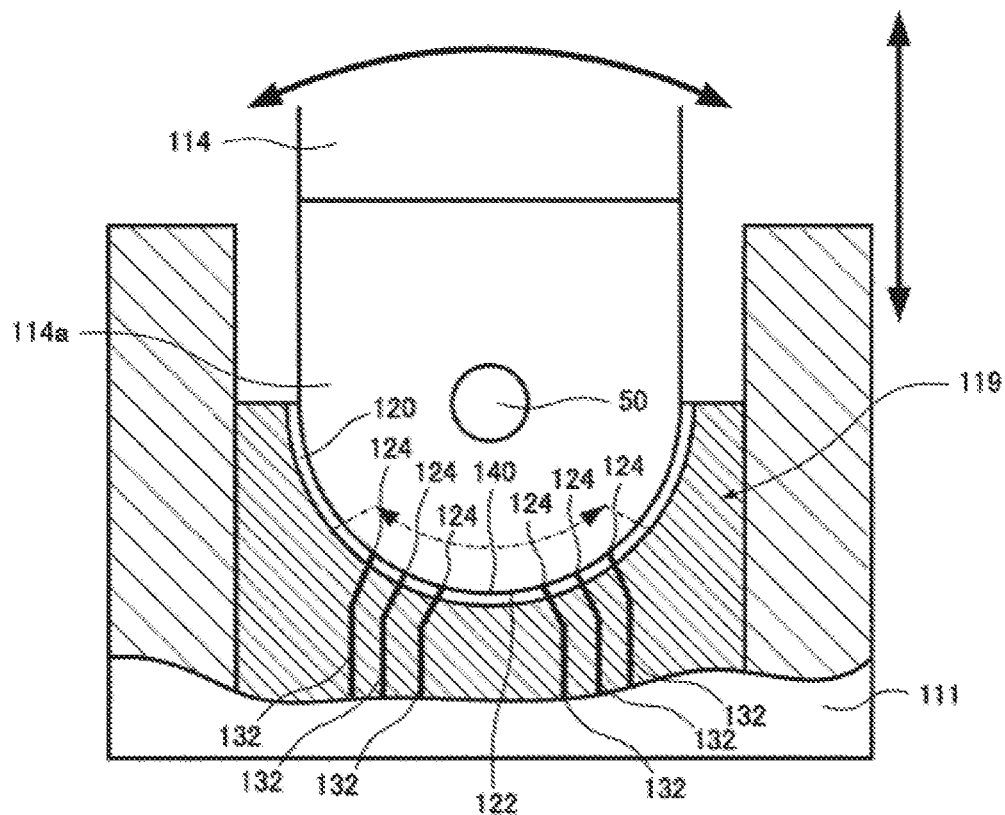
FIG. 9 is an enlarged sectional view of a connecting section according to the second embodiment.
Figure 10:
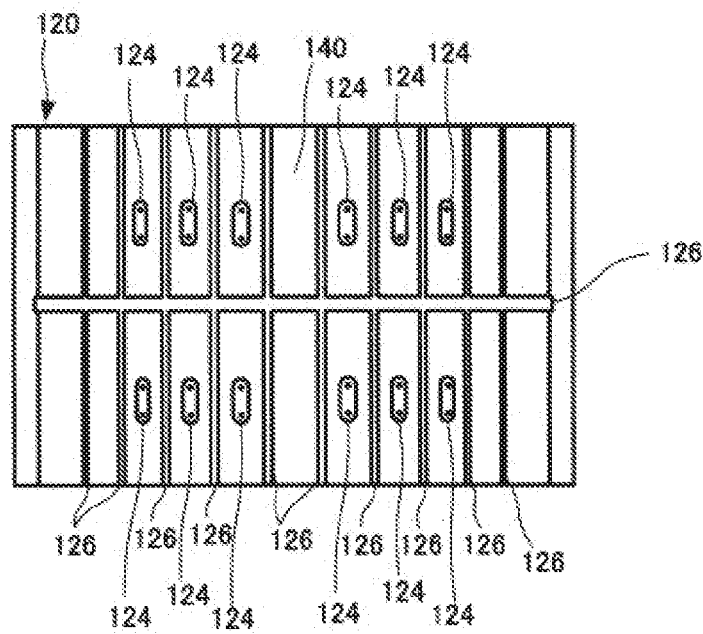
FIG. 10 is a plan view of a sliding bearing according to the second embodiment.

Next, a sliding bearing 120 according to a second embodiment will be described with reference to FIGS. 8 to 10. FIG. 8 is a front view of a servo press machine 110 according to the second embodiment, FIG. 9 is an enlarged sectional view of a connecting section 119 according to the second embodiment, and FIG. 10 is a plan view of the sliding bearing 120 according to the second embodiment. The servo press machine 110 shown in FIG. 8 employs an eccentric boss as the eccentric shaft 113.

The servo press machine 110 includes: an eccentric shaft 113 that is rotationally driven by a servomotor 118; a connecting rod 114 that moves upward and downward due to the rotational driving of the eccentric shaft 113; a slide 111 that moves upward and downward as the connecting rod 114 moves upward and downward; and the connecting section 119 that connects a tip section 114a of the connecting rod 114 with the slide 111.

A rotation of the servomotor 118 is transmitted to a main gear 115 via a drive gear 60 and a synchronous distribution gear 62, and rotationally drives the eccentric shaft 113.

The connecting section 119 is formed on an upper surface of the slide 111. The connecting section 119 and the tip section 114a of the connecting rod 114 are connected by a horizontal pin 50 such that the connecting section 119 is rotatable with respect to the tip section 114a. According to this configuration, the connecting rod 114 is rotatable around the horizontal pin 50, and the connecting section 119 moves upward and downward as the connecting rod 114 moves upward and downward.

As illustrated in FIG. 9, the servo press machine 110 includes: a sliding surface 122 on which a press load acts during press working; a sliding surface 140 on which a press load acts and which slides with the sliding surface 122; an oil supply port 124 which opens on the sliding surface 122 or the sliding surface 140 and which supplies a lubricant between the sliding surface 122 (hereinafter, referred to as a connecting rod tip section-side sliding surface 122) and the sliding surface 140 (hereinafter, referred to as a connecting section-side sliding surface 140); and a supply mechanism (not shown) which supplies the lubricant to the oil supply port 124. As the supply mechanism, the supply mechanism 30 described in the first embodiment can be applied.

The supply mechanism (not shown) delivers a lubricant to the oil supply port 124 and pressurizes the lubricant during a press load period in which the oil supply port 124 is closed by the connecting section-side sliding surface 140 or the connecting rod tip section-side sliding surface 122 on which a press load acts. The pressurized lubricant is supplied between the connecting rod tip section-side sliding surface 122 and the connecting section-side sliding surface 140 from the oil supply port 124 during a non-press load period in which a press load is not acting on the connecting rod tip section-side sliding surface 122 and the connecting section-side sliding surface 140.

The connecting rod tip section-side sliding surface 122 that is a part of an outer circumferential surface of the tip section 114a of the connecting rod 114 slides with the connecting section-side sliding surface 140 that is a concave surface of the connecting section 119. The connecting section-side sliding surface 140 is an inner circumferential surface of the sliding bearing 120 interposed between the connecting rod tip section-side sliding surface 122 and the connecting section 119. The oil supply port 124 is formed on the connecting section-side sliding surface 140 of the sliding bearing 120. The lubricant can be reliably supplied between the tip section 114a of the connecting rod 114 subjected to a press working load and the connecting section 119 from the oil supply port 124. Alternatively, the oil supply port 124 can be formed on the connecting rod tip section-side sliding surface 122.

An oil supply groove 126 for supplying the lubricant which extends over the entire connecting rod tip section-side sliding surface 122 or the entire connecting section-side sliding surface 140 is formed on the connecting rod tip section-side sliding surface 122 or the connecting section-side sliding surface 140. The oil supply port 124 opens in a region where the oil supply groove 126 is not formed. This enables the lubricant to be supplied from the oil supply port 124 to a region of the connecting section-side sliding surface 140 to which the lubricant is not supplied from the oil supply groove 126 during press working.

The connecting section 119 has the sliding bearing 120 in a portion that slides with the tip section 114a. The sliding bearing 120 is fixed to the connecting section 119. The sliding bearing 120 has the connecting section-side sliding surface 140 formed of a concave arc surface that conforms to the tip section 114a having a downward convex arc surface (the connecting rod tip section-side sliding surface 122). The sliding bearing 120 is a curved sheet metal.

The sliding bearing 120 has a plurality of oil supply ports 124 that open on the connecting section-side sliding surface 140. The oil supply port 124 is an open end of an oil supply path 132 that extends so as to penetrate the sliding bearing 120 from the connecting section 119. The oil supply path 132 is connected to a supply mechanism (not shown) and is continuously or intermittently fed with the lubricant.

As illustrated in FIG. 10, the oil supply groove 126 is formed so as to extend over the entire connecting section-side sliding surface 140. The oil supply port 124 is provided in at least a region of the connecting section-side sliding surface 140 on which a press load acts during press working, specifically, in each section of the connecting section-side sliding surface 140 partitioned by the oil supply groove 126. The oil supply port 124 is formed in a region other than a portion which mostly receives a press load when the slide 111 is at bottom dead center. Forming the oil supply port 124 in a region other than a portion which mostly receives a press load enables the oil supply port 124 to be provided on the connecting rod tip section-side sliding surface 122 or the connecting section-side sliding surface 140 without reducing mechanical strength of the portion which mostly receives the press load. A section at the center of FIG. 10 is a section that includes a portion which mostly receives a press load from the connecting rod 114 when the slide 111 is at bottom dead center and, while the oil supply port 124 is not formed in this section, the oil supply port 124 may be formed therein if mechanical strength of the section is sufficient.

As illustrated in FIG. 10, the oil supply port 124 includes an oil reservoir which has an opening area greater than an area of a cross section of the oil supply path 132 (FIG. 9) extending toward the oil supply port 124. As the oil reservoir, the oil reservoir 25 according to the first embodiment can be adopted. Providing the oil reservoir in the sliding bearing 120 enables the lubricant to be supplied to the connecting rod tip section-side sliding surface 122 in an efficient manner.

Maximum pressure of the lubricant supplied to the oil supply port 124 during the press load period is set so as to correspond to a force exceeding a load or a force causing the connecting rod tip section-side sliding surface 122 and the connecting section-side sliding surface 140 to come into close contact with each other during the non-press load period. Setting such maximum pressure enables the lubricant to be supplied between the connecting rod tip section-side sliding surface 122 and the connecting section-side sliding surface 140 from the oil supply port 124 against a load or a force that causes the connecting rod tip section-side sliding surface 122 and the connecting section-side sliding surface 140 to come into close contact with each other during the non-press load period. The maximum pressure of the lubricant in the oil supply port 124 is capable of canceling the close contact between the connecting rod tip section-side sliding surface 122 and the connecting section-side sliding surface 140 and spreading the lubricant between the connecting rod tip section-side sliding surface 122 and the connecting section-side sliding surface 140.

The oil supply port 24 can be provided in each section of the sliding bearing 20 shown in FIG. 4 in a similar manner to FIG. 10.

4. Modifications

Figure 11:
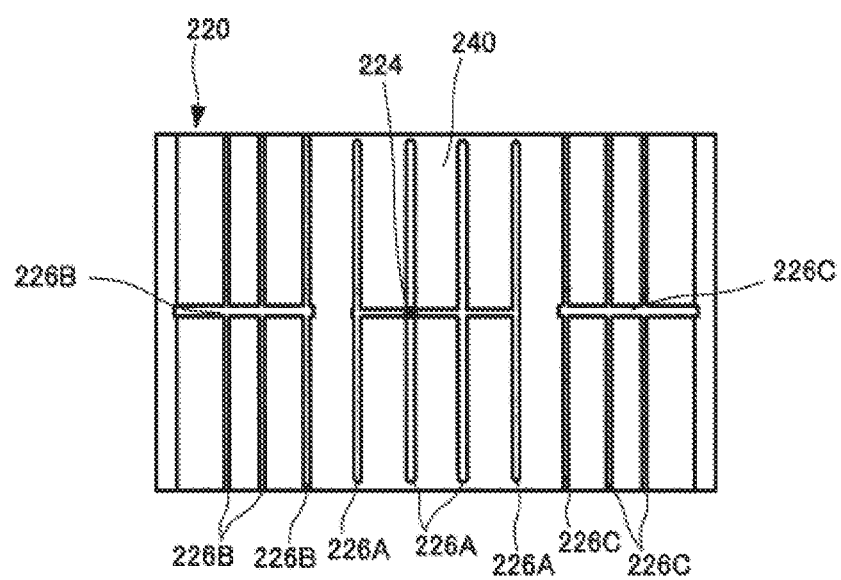
FIG. 11 is a plan view of a sliding bearing according to a modification.

Next, a sliding bearing 220 according to a modification will be described with reference to FIG. 11. FIG. 11 is a plan view of the sliding bearing 220 according to a modification.

The sliding bearing 220 shown in FIG. 11 can be used in the servo press machine 110 in place of the sliding bearing 120 according to the second embodiment. The sliding bearing 220 differs from the sliding bearing 120 according to the second embodiment in a shape of the oil supply groove 126 in a plan view and in a formation position of the oil supply ports. The difference from the sliding bearing 120 according to the second embodiment is that oil supply grooves 226A to 226C extending in a longitudinal direction of a curving connecting section-side sliding surface 240 are partially discontinuous and that an oil supply port 224 is provided so as to open at a location where the oil supply groove 226A is formed. In addition, the oil supply port 224 is not formed at locations where the oil supply grooves 226B and 226C which are exposed to air are formed.

Also in the sliding bearing 20 shown in FIG. 4, the oil supply port 24 can be provided so as to open at the location where the oil supply groove 26 is formed in a similar manner to FIG. 11.

It is to be understood that the invention is not limited to the embodiments described above and various modifications can be further made thereto and that the invention includes configurations which are substantially the same as the configurations described in the embodiments (configurations of which a function, a method, and a result are the same or configurations of which an object and an effect are the same). For example, the lubricant can be reliably supplied between the frame 12 and the eccentric shaft 13 by providing a lubricant supply mechanism similar to that in the embodiments described above to either the side of the frame 12 or the eccentric shaft 13 within spaces between an upper outer circumferential surface of a portion rotatably supported by the frame 12 in the eccentric shaft 13 and an upper inner circumferential surface of a portion that supports the eccentric shaft 13 in the frame 12 (inside the dotted frames shown in FIG. 2). The invention also includes various other configurations obtained by replacing non-essential elements of the configurations described in the embodiments with other elements. The invention also includes various other configurations having the same effects as those of the configurations described in the embodiments, or various other configurations capable of achieving the same objectives as those of the configurations described in the embodiments. Furthermore, the invention includes various other configurations in which known techniques are added to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A servo press machine comprising:
    an eccentric shaft which is rotationally driven by a servomotor, the eccentric shaft having an outer circumference surface;
    a connecting rod which moves upward and downward due to the rotational driving of the eccentric shaft;
    a sliding bearing disposed between the eccentric shaft and the connecting rod; and a slide which moves upward and downward as the connecting rod moves upward and downward, wherein the eccentric shaft has an eccentric shaft-side sliding surface which is the outer circumference surface of the eccentric shaft, wherein the sliding bearing has a connecting rod-side sliding surface which slides with the eccentric shaft-side sliding surface, and the connecting rod-side sliding surface is an inner circumferential surface of the sliding bearing, wherein the sliding bearing has an oil supply port, the oil supply port being disposed in the connecting rod-side sliding surface to supply a lubricant between the eccentric shaft-side sliding surface and the connecting rod-side sliding surface, wherein the servo press machine further comprises a lubricant supply which supplies the lubricant to the oil supply port, wherein when the servo press machine is in a press load period in which a workpiece is being pressed, (1) the eccentric shaft-side sliding surface and the connecting rod-side sliding surface press against each other to close the oil supply port by the eccentric shaft-side sliding surface, and (2) the lubricant supply supplies the lubricant to the oil supply port, closed by the eccentric shaft-side sliding surface, and pressurizes the lubricant during the press load period, wherein when the servo press machine is not in the press load period, the lubricant supply supplies the pressurized lubricant between the eccentric shaft-side sliding surface and the connecting rod-side sliding surface from the oil supply port, wherein the servo press machine further comprises an oil supply groove for supplying the lubricant, the oil supply groove being formed on the eccentric shaft-side sliding surface or the connecting rod-side sliding surface so as to extend over the entire eccentric shaft-side sliding surface or the entire connecting rod-side sliding surface, and wherein the oil supply port opens in a region where the oil supply groove is not formed.

2. The servo press machine according to claim 1, wherein the oil supply port includes an oil reservoir which has an opening area greater than an area of a cross section of an oil supply path extending toward the oil supply port.

3. The servo press machine according to claim 1, wherein the oil supply port is formed in a region other than a portion which mostly receives force caused by a connecting rod tip section-side sliding surface and a connecting section-side sliding surface pressing against each other when the slide is at bottom dead center.

4. The servo press machine according to claim 1, wherein the lubricant supply further comprises:
   a distributor formed of a plurality of lubricant discharge blocks; and
   a pump which delivers the lubricant to the distributor,
wherein each of the plurality of lubricant discharge blocks is connected to the oil supply port, and
wherein, when the oil supply port is closed during the press load period, the lubricant is pressurized by being discharged from the lubricant discharge blocks.

5. The servo press machine according to claim 1, wherein the oil supply port includes an oil reservoir, wherein the lubricant supply includes an oil supply path connected to the oil reservoir, wherein an opening area of the oil reservoir is configured to be wider than an area of a cross section of the oil supply path.

6. A servo press machine comprising:
an eccentric shaft which is rotationally driven by a servomotor, the eccentric shaft having an outer circumference surface;
a connecting rod which moves upward and downward due to the rotational driving of the eccentric shaft;
a sliding bearing disposed between the eccentric shaft and the connecting rod; and
a slide which moves upward and downward as the connecting rod moves upward and downward,
wherein the eccentric shaft has an eccentric shaft-side sliding surface which is the outer circumference surface of the eccentric shaft,
wherein the sliding bearing has a connecting rod-side sliding surface which slides with the eccentric shaft-side sliding surface, and the connecting rod-side sliding surface is an inner circumferential surface of the sliding bearing,
wherein the sliding bearing has an oil supply port, the oil supply port being disposed in the connecting rod-side sliding surface to supply a lubricant between the eccentric shaft-side sliding surface and the connecting rod-side sliding surface,
wherein the servo press machine further comprises a lubricant supply which supplies the lubricant to the oil supply port,
wherein when the servo press machine is in a press load period in which a workpiece is being pressed, (1) the eccentric shaft-side sliding surface and the connecting rod-side sliding surface press against each other to close the oil supply port by the eccentric shaft-side sliding surface, and (2) the lubricant supply supplies the lubricant to the oil supply port, closed by the eccentric shaft-side sliding surface, and pressurizes the lubricant during the press load period,
wherein when the servo press machine is not in the press load period, the lubricant supply supplies the pressurized lubricant between the eccentric shaft-side sliding surface and the connecting rod-side sliding surface from the oil supply port, and
wherein a maximum pressure of the lubricant in the oil supply port during the press load period exceeds a force causing the eccentric shaft-side sliding surface and the connecting rod-side sliding surface to come into close contact with each other when the servo press machine is not in the press load period.

7. A servo press machine comprising:
an eccentric shaft which is rotationally driven by a servomotor;
a connecting rod which moves upward and downward due to the rotational driving of the eccentric shaft, the connecting rod having a tip section;
a slide which moves upward and downward as the connecting rod moves upward and downward;
a connecting section which connects the tip section of the connecting rod and the slide with each other; and
a sliding bearing disposed between the tip section of the connecting rod and the connecting section,
wherein the tip section of the connecting rod has a connecting rod tip section-side sliding surface which is a part of an outer circumferential surface of the tip section;
wherein the sliding bearing has a connecting section-side sliding surface which slides with the connecting rod tip section-side sliding surface, and the connecting section-side sliding surface is an inner circumferential surface of the sliding bearing, wherein the sliding bearing has an oil supply port, the oil supply port being disposed in the connecting section-side sliding surface to supply a lubricant between the connecting rod tip section-side sliding surface and the connecting section-side sliding surface, wherein the servo press machine further comprises a lubricant supply which supplies the lubricant to the oil supply port, wherein when the servo press machine is in a press load period in which a workpiece is being pressed, (1) the connecting rod tip section-side sliding surface and the connecting section-side sliding surface press against each other to close the oil supply port by the connecting rod tip section-side sliding surface, and (2) the lubricant supply supplies the lubricant to the oil supply port, closed by the connecting rod tip section-side sliding surface, and pressurizes the lubricant during the press load period, wherein when the servo press machine is not in the press load period, the lubricant supply supplies the pressurized lubricant between the connecting rod tip section-side sliding surface and the connecting section-side sliding surface from the oil supply port, wherein a servo press machine further comprises an oil supply groove for supplying the lubricant, the oil supply groove being formed on the connecting rod tip section-side sliding surface or the connecting section-side sliding surface so as to extend over the entire connecting rod tip section-side sliding surface or the entire connecting section-side sliding surface, and wherein the oil supply port opens in a region where the oil supply groove is not formed.

8. The servo press machine according to claim 7,
wherein the oil supply port includes an oil reservoir,
wherein the lubricant supply includes an oil supply path connected to the oil reservoir,
wherein an opening area of the oil reservoir is configured to be wider than an area of a cross section of the oil supply path.

9. A servo press machine comprising:
an eccentric shaft which is rotationally driven by a servomotor;
a connecting rod which moves upward and downward due to the rotational driving of the eccentric shaft, the connecting rod having a tip section;
a slide which moves upward and downward as the connecting rod moves upward and downward;
a connecting section which connects the tip section of the connecting rod and the slide with each other; and
a sliding bearing disposed between the tip section of the connecting rod and the connecting section, wherein the tip section of the connecting rod has a connecting rod tip section-side sliding surface which is a part of an outer circumferential surface of the tip section;

wherein the sliding bearing has a connecting section-side sliding surface which slides with the connecting rod tip section-side sliding surface, and the connecting section-side sliding surface is an inner circumferential surface of the sliding bearing, wherein the sliding bearing has an oil supply port, the oil supply port being disposed in the connecting section-side sliding surface to supply a lubricant between the connecting rod tip section-side sliding surface and the connecting section-side sliding surface, wherein the servo press machine further comprises a lubricant supply which supplies the lubricant to the oil supply port, wherein when the servo press machine is in a press load period in which a workpiece is being pressed, (1) the connecting rod tip section-side sliding surface and the connecting section-side sliding surface press against each other to close the oil supply port by the connecting rod tip section-side sliding surface, and (2) the lubricant supply supplies the lubricant to the oil supply port, closed by the connecting rod tip section-side sliding surface, and pressurizes the lubricant during the press load period, wherein when the servo press machine is not in the press load period, the lubricant supply supplies the pressurized lubricant between the connecting rod tip section-side sliding surface and the connecting section-side sliding surface from the oil supply port, and wherein a maximum pressure of the lubricant in the oil supply port during the press load period exceeds a force causing the connecting rod tip section-side sliding surface and the connecting section-side sliding surface to come into close contact with each other when the servo press machine is not in the press load period.

* * * * *